(12) United States Patent
Gil et al.

(10) Patent No.: US 7,845,472 B2
(45) Date of Patent: Dec. 7, 2010

(54) CABLE-DRIVING APPARATUS AND PARKING BRAKE SYSTEM USING PLANET GEAR ASSEMBLY

(75) Inventors: Hyuck-Moon Gil, Gyeongsangbuk-do (KR); Byung-Ki Kim, Gyeongsangbuk-do (KR); Young-Eon Jung, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 926 days.

(21) Appl. No.: 11/645,489

(22) Filed: Dec. 26, 2006

(65) Prior Publication Data

US 2007/0151816 A1    Jul. 5, 2007

(30) Foreign Application Priority Data

Dec. 29, 2005    (KR)    ............... 10-2005-0133847

(51) Int. Cl.
*F16D 65/14*    (2006.01)

(52) U.S. Cl. ............... 188/2 D; 188/156; 188/72.8

(58) Field of Classification Search ........... 188/2 D, 188/156, 158, 162, 72.6, 72.7, 72.8; 74/501.5 R, 74/501.6, 502.4; 192/219.4
See application file for complete search history.

(56) References Cited

U.S. PATENT DOCUMENTS

| | | | | |
|---|---|---|---|---|
| 4,795,002 A * | 1/1989 | Burgei et al. | ............... | 188/2 D |
| 6,193,022 B1 * | 2/2001 | Bode | ............... | 188/2 D |
| 6,244,129 B1 * | 6/2001 | Krug et al. | ............... | 74/501.5 R |
| 6,386,338 B1 | 5/2002 | Powrozek | | |
| 6,502,652 B2 | 1/2003 | Rogg et al. | | |
| 6,533,082 B2 | 3/2003 | Gill et al. | | |
| 6,863,162 B1 * | 3/2005 | Gabas | ............... | 188/2 D |
| 7,458,649 B2 * | 12/2008 | Jeon | ............... | 303/89 |
| 2006/0000679 A1 * | 1/2006 | Hanna et al. | ............... | 188/106 P |
| 2006/0289248 A1 * | 12/2006 | Noh | ............... | 188/2 D |
| 2008/0093183 A1 * | 4/2008 | Maier et al. | ............... | 188/156 |

FOREIGN PATENT DOCUMENTS

KR    1998-057163 A1    9/1998

* cited by examiner

*Primary Examiner*—Xuan Lan Nguyen
(74) *Attorney, Agent, or Firm*—Edwards Angell Palmer & Dodge LLP; Kongsik Kim

(57) ABSTRACT

Provided are a cable-driving apparatus that performs the function of an equalizer using a planet gear assembly, and a parking brake system using the cable-driving apparatus. The cable-driving apparatus includes a driving motor; a first planet gear assembly for reducing a rotational velocity of the driving motor; and a second planet gear assembly coupled to the first planet gear assembly, wherein a first parking brake cable is connected to a circumferential outer surface of a ring gear of the second planet gear assembly, and a second parking brake cable is connected to a circumferential outer surface of a carrier of the second planet gear assembly in an opposite direction to the first parking brake cable.

20 Claims, 15 Drawing Sheets

FIG. 3

| CASE | CONFIGURATION | RING GEAR | CARRIER | SUN GEAR | TRANSMISSION RATIO | RESULT |
|---|---|---|---|---|---|---|
| 1 | PLANET GEAR, RING GEAR ($Z_R$), CARRIER ($Z_S+Z_R$), DRIVING, SUN GEAR ($Z_S$) | DRIVEN | DRIVING | DRIVING | $0 < Z_R/(Z_S+Z_R) < 1$ | ACCELERATION |
| 2 | | DRIVING | DRIVEN | DRIVING | $(Z_S+Z_R)/Z_R > 1$ | DECELERATION |
| 3 | | DRIVING | DRIVING | DRIVEN | $0 < Z_S/(Z_S+Z_R) < 1$ | ACCELERATION |
| 4 | | DRIVING | DRIVEN | DRIVING | $(Z_S+Z_R)/Z_S > 1$ | DECELERATION |
| 5 | | DRIVING | DRIVING | DRIVEN | $-1 < -Z_S/Z_R < 0$ | REVERSED ACCELERATION |
| 6 | | DRIVEN | DRIVING | DRIVING | $-Z_R/Z_S < -1$ | REVERSED DECELERATION |

CABLE-DRIVING APPARATUS AND PARKING BRAKE SYSTEM USING PLANET GEAR ASSEMBLY

CROSS-REFERENCE TO RELATED APPLICATION

This application is based on and claims priority from Korean Patent Application No. 10-2005-133847 filed on Dec. 29, 2005 in the Korean Intellectual Property Office, the disclosure of which is incorporated herein in its entirety by reference.

BACKGROUND OF THE INVENTION

1. Field of the Invention

The present invention relates to a cable-driving apparatus used in the parking brake of a vehicle, and more particularly to a cable-driving apparatus which performs the function of an equalizer using a planet gear assembly, and a parking brake system using the cable-driving apparatus:

2. Description of the Prior Art

Generally, modern automobiles and other motor vehicles are provided with a power-assisted parking brake. The power-assisted parking brake is system that is electrically driven to remotely actuate the brake of a vehicle (generally, one of a front wheel brake and a rear wheel brake), thereby preventing the vehicle from being moved when it is parked. The system includes an electric motor and a rotational-to-linear driving mechanism, so that the rotational motion and torque of the motor can be converted into the linear displacement of the brake cable mechanically connected to the brake. When actuating the brake, as the motor is actuated, the brake cable is displaced, and braking is effected. Through a similar course, the braked state can be remotely released by reversely rotating the motor. In the event that a power supply system to the vehicle does not work (for example, in the case of towing), the braked state can be manually released using an emergency release mechanism, and the vehicle can be moved.

FIG. 1 illustrates the electronic parking brake 10 using a conventional cable-driving apparatus disclosed in Japanese Unexamined Patent Publication No. 2004-263812.

The electronic parking brake 10 includes rear cables 12 which are connected to the brake levers of wheels 11, an equalizer 13 which is connected to ends of the rear cables 12, and a front cable 14 which is connected to the equalizer 13. As the rear cables 12 and the front cable 14, a pull control cable is employed, in which a cable can freely slide in a tubular element. In the electronic parking brake 10, the front cable 14 is wound on a drum 15.

In the electronic parking brake 10, as a switch (not shown) is manipulated, braking can be effected or a braked state can be released through winding or unwinding of the front cable 14. That is to say, by rotating the motor provided in a cable-driving apparatus 17 and winding the front cable 14 on the drum 15, the front cable 14 and the rear cables 12 can be pulled against the resistant force of the return springs provided to the brake levers, and braking is effected. If the motor is rotated in a reverse direction, the drum 15 is reversely rotated, and the front cable 14 is unwound from the drum 15 by the elastic force of the return springs provided to the brake levers, and the braked state is released. The operation of the motor can be controlled by a controller 18. If an emergency situation such as the breakdown of an electrical system or a voltage drop occurs, by manipulating a release lever 16, a gear locking mechanism can be unlocked, and as a result, the parking brake system itself can be released.

In the conventional cable-driving apparatus and the electronic parking brake, as a driver manipulates a parking brake button, the motor is actuated, the rpm of the motor is reduced in a reduction gear box, and torque is increased. Consequently, as the cable is pulled, the parking brake operates. The conventional electronic parking brake encounters a problem in that, since a separate device is needed to realize the functionality of the equalizer, a structure is complicated, the size of a product increases, and production cost is increased.

Moreover, because the two rear cables are pulled by one driving motor, it is difficult to precisely equalize the tension applied to the two rear cables. Due to this fact, as a deviation is induced in the braking force applied to the respective wheels, braking efficiency deteriorates, and the passenger safety decreases.

SUMMARY OF THE INVENTION

Aspects of the present invention provide a cable-driving apparatus which ensures the safety of passengers, improves the space utilization efficiency of a vehicle, and enables the same braking force to be applied to both wheels without using a separate equalizer, and an electronic parking brake using the same.

Aspects of the present invention also provide an emergency release mechanism for the electronic parking brake which can release a braked state through a simple manipulation.

According an aspect of the present invention, there is provided a cable-driving apparatus including a driving motor; a first planet gear assembly reducing a rotational velocity of the driving motor; and a second planet gear assembly coupled to the first planet gear assembly, in which a first parking brake cable is connected to a circumferential outer surface of a ring gear of the second planet gear assembly, and a second parking brake cable is connected to a circumferential outer surface of a carrier of the second planet gear assembly in an opposite direction to the first parking brake cable.

According another aspect of the present invention, there is provided a cable-driving apparatus including a driving motor; and a planet gear assembly receiving a torque from the driving motor, in which a first parking brake cable is connected to a circumferential outer surface of a ring gear of the planet gear assembly, and a second parking brake cable is connected to a circumferential outer surface of a carrier of the planet gear assembly in an opposite direction to the first parking brake cable.

BRIEF DESCRIPTION OF THE DRAWINGS

The above and other aspects and features of the present invention will be apparent from the following detailed description taken in conjunction with the accompanying drawings, in which:

FIG. 3 is a table summarizing the operating patterns of a general planet gear assembly;

DETAILED DESCRIPTION OF THE EXEMPLARY EMBODIMENTS

Figure 1:
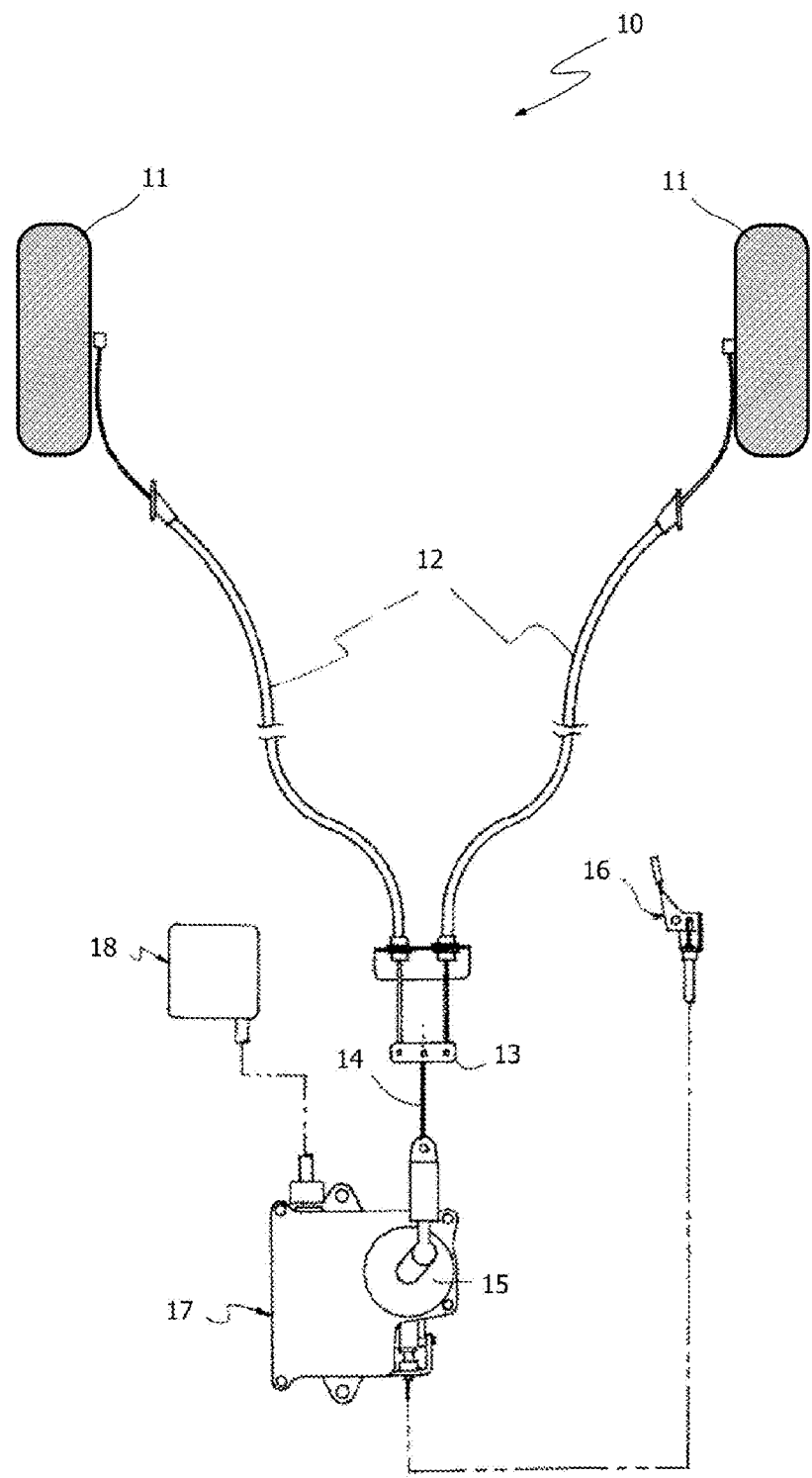
FIG. 1 is a schematic view illustrating an electronic parking brake using a conventional cable-driving apparatus.

Hereinafter, exemplary embodiments of the present invention will be described with reference to the accompanying drawings. However, it is to be readily understood that the present invention is not limited to the illustrated exemplary embodiments and can be realized in various shapes and patterns. The illustrated exemplary embodiments are provided to properly disclose of the present invention and to appropriately inform a person skilled in the art of the scope of the present invention which is defined only by the attached claims. In the following description, the same reference numerals will be used throughout the drawings and the description to refer to the same or similar parts.

The present invention realizes a cable-driving apparatus used in an electronic parking brake employing a planet gear assembly. Due to this construction, the same tension can be applied to rear cables, and an emergency release mechanism having a simple structure can be provided.

Figure 2:
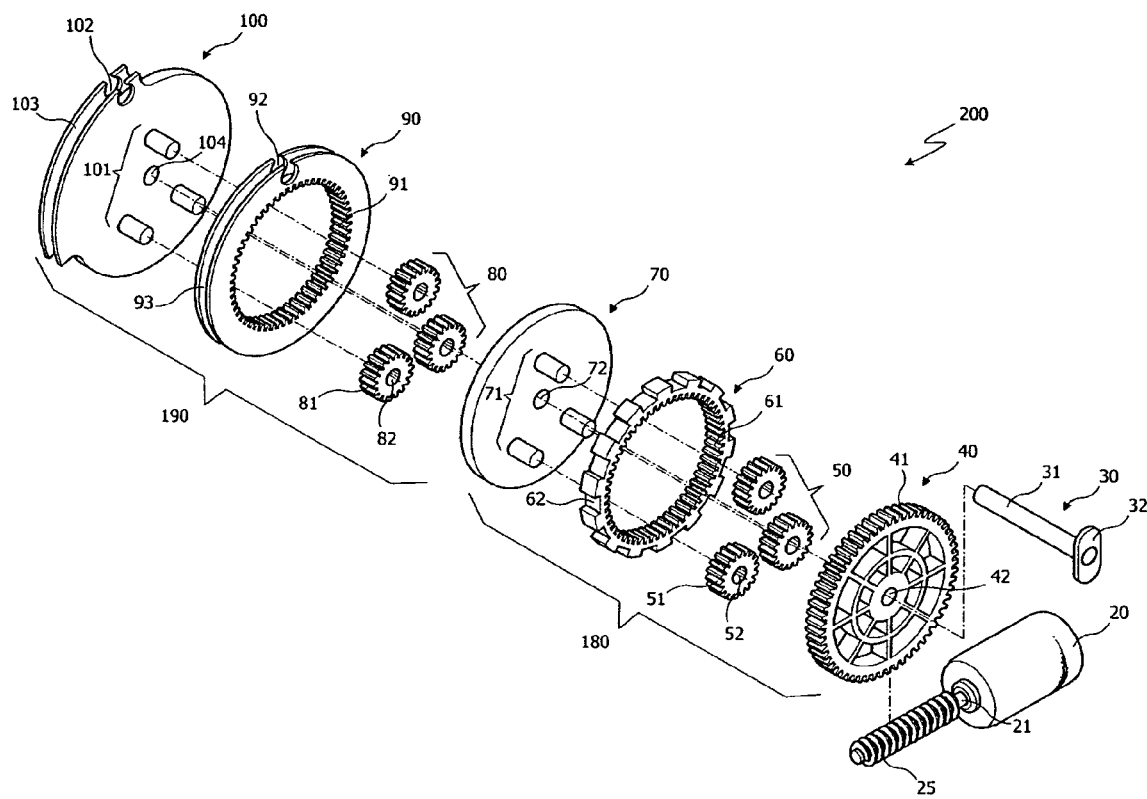
FIG. 2 is an exploded perspective view illustrating the construction of a cable-driving apparatus in accordance with a first embodiment of the present invention.

FIG. 2 is an exploded perspective view illustrating the construction of a cable-driving apparatus 200 in accordance with a first embodiment of the present invention. The cable-driving apparatus 200 is connected to parking brake cables (hereinafter, simply referred to as "parking cables") of a vehicle and is mounted to the undercarriage of the vehicle. The cable-driving apparatus 200 may include a driving motor 20, a first planet gear assembly 180, and a second planet gear assembly 190. Also, the cable-driving apparatus 200 may further include a connection pin 30 which coaxially couples the first planet gear assembly 180 and the second planet gear assembly 190 to each other. The connection pin 30 passes through the center hole 42 of a driving gear 40, the center hole 72 of a first carrier 70, and the center hole 104 of a second carrier 100. The connection pin 30 has a shaft element 31 which passes through the assemblies 180 and 190, and a stopper element 32 which limits the axial movement of the connection pin 30 to some extent.

The first planet gear assembly 180 functions to reduce the rotational velocity transmitted from the driving motor 20 and to operate an emergency release mechanism. The second planet gear assembly 190 is connected to the parking cables to apply substantially the same tension to the respective parking cables. If the reduction of the rotational velocity can be conducted by other elements such as a worm gear, and the like, and the mounting of the emergency release mechanism according to the present invention is not necessary, the first planet gear assembly 180 can be omitted, as a result of which a second embodiment of the present invention is constructed as will be described later with reference to FIG. 19.

In general, a planet gear assembly is mainly used to reduce a rotational velocity, and includes a sun gear, planet gears, a ring gear, and a carrier. The first planet gear assembly 180 includes a driving gear 40 which has a first sun gear 43 (see FIG. 4) on one surface thereof, a plurality of first planet gears 50, a first ring gear 60, and a first carrier 70. The second planet gear assembly 190 includes a second sun gear 73 (see FIG. 6) which is formed on one surface of the first carrier 70, a plurality of second planet gears 80, a second ring gear 90, and a second carrier 100. In FIG. 2, when viewed in terms of functionality, the second sun gear 73 constitutes the second planet gear assembly 190, and the first carrier 70 constitutes the first planet gear assembly 180. However, in the actual structure, the second sun gear 73 is formed on one surface of the first carrier 70.

In the first embodiment, the torque transmitted from the driving motor 20 is reduced while passing through the first planet gear assembly 180, and then functions to apply substantially the same tension to the two parking cables after passing through the second planet gear assembly 190. At this time, due to the fact that the emergency release mechanism 110 (see FIG. 11) is engaged into one of the locking grooves 62 defined on the circumferential outer surface of the first ring gear 60, the movement of the first ring gear 60 is prevented.

FIG. 3 is a table summarizing the operating patterns of a general planet gear assembly.

As is well known in the art, when the number of teeth of a ring gear is $Z_R$ and the number of teeth of a sun gear is $Z_S$, an equivalent number of teeth of a carrier is $Z_R+Z_S$. A planet gear assembly is structured in a manner such that, by fixing one and driving another one of the three components, that is, the ring gear, the sun gear and the carrier, various results can be obtained. If two of the three components are fixed, as planet gears are resultantly fixed, an effect is obtained, in which the sun gear and the carrier are directly connected to each other. If the three components are set free, a neutral state is the result.

The six cases shown in FIG. 3 have different transmission ratios. If a transmission ratio is a negative number, it indicates reverse rotation, that is, it means that the rotating directions of the sun gear and the carrier are opposite to each other. Also, if the transmission ratio is greater than 1, it represents deceleration, and if the transmission ratio is less than 1, it represents acceleration.

In the first planet gear assembly 180, the first sun gear 43 (see FIG. 4) is in a driving state, the first ring gear 60 is held in a fixed state by the emergency release mechanism 110, and the first carrier 70 is in a driven state, which corresponds to case no. 4 of FIG. 3. Accordingly, when viewed in its entirety, the first planet gear assembly 180 functions to reduce a rotational velocity (so that the rotational velocity of the first carrier 70 is slower than that of the first sun gear 43). At this time, the transmission ratio is $(Z_S+Z_R)/Z_S$.

In the second planet gear assembly 190, the second sun gear 73, which is formed on the first carrier 70 or is directly coupled to the first carrier 70, performs a driving function. The circumferential outer surface of the second ring gear 90 is defined with a first parking cable groove 93 so that the first parking cable 120 (see FIG. 6) can be wound in the first parking cable groove 93. Further, the circumferential outer surface of the second ring gear 90 is defined with first fitting grooves 92 so that both ends of a first fastening member 94 (see FIG. 6) for fastening an end of the first parking cable 120 can be respectively fitted into the first fitting grooves 92. The circumferential outer surface of the second carrier 100 is defined with a second parking cable groove 103 so that the second parking cable 130 (see FIG. 7) can be wound in the second parking cable groove 103. Further, the circumferential outer surface of the second carrier 100 is defined with second fitting grooves 102 so that both ends of a second fastening member 105 (see FIG. 7) for fastening an end of the second parking cable 130 can be respectively fitted into the second fitting grooves 102.

When viewed from the second ring gear 90 and the second carrier 100, the first parking cable 120 and the second parking cable 130 serve as external force application sources for generating torque. Any one of the second ring gear 90 and the second carrier 100 is not fixed, and loads are applied to the second ring gear 90 and the second carrier 100 from wheels via the parking cables 120 and 130. In this regard, between the parking cables 120 and 130, one cable applied with a great load serves as if it is fixed, and the other cable applied with a small load serves as if it is driven.

Describing this with reference to FIG. 3, in the case where the load applied to the first parking cable 120 is greater, momentarily, the second ring gear 90 is in a fixed state, and the second carrier 100 is in a driven state. This situation corresponds to case no. 4 of FIG. 3. Therefore, when assuming the second sun gear 73 as an input side and the second carrier 100 as an output side, the second sun gear 73 and the second carrier 100 are rotated in the same direction, and deceleration occurs in conformity with a corresponding transmission ratio.

In the case where the load applied to the second parking cable 130 is greater, momentarily, the second carrier 100 is in a fixed state, and the second ring gear 90 is in a driven state. This situation corresponds to case no. 6 of FIG. 3. Therefore, when assuming the second sun gear 73 as an input side and the second ring gear 90 as an output side, the second sun gear 73 and the second ring gear 90 are rotated in opposite directions, and deceleration, that is, reversed deceleration occurs in conformity with a corresponding transmission ratio.

In practice, depending upon the loads applied to the first parking cable 120 and the second parking cable 130, an operation in which Case Nos. 4 and 6 are mixed may result. In any case, the rotation directions of the second sun gear 73 and the second carrier 100 are the same, and the rotation directions of the second sun gear 73 and the second ring gear 90 are opposite to each other. In this way, even when the loads applied to the first parking cable 120 and the second parking cable 130 are slightly different from each other, the second ring gear 90 and the second carrier 100 cooperate with each other, and can equalize the loads.

At this time, the second planet gear assembly 190 pulls the first parking cable 120 and the second parking cable 130 connected thereto with substantially similar tension, and thereby performs the function of an equalizer. The principle and the condition by and under which the same tension is applied to the two parking cables will be described later in detail with reference to FIGS. 8 and 9.

Figure 4:
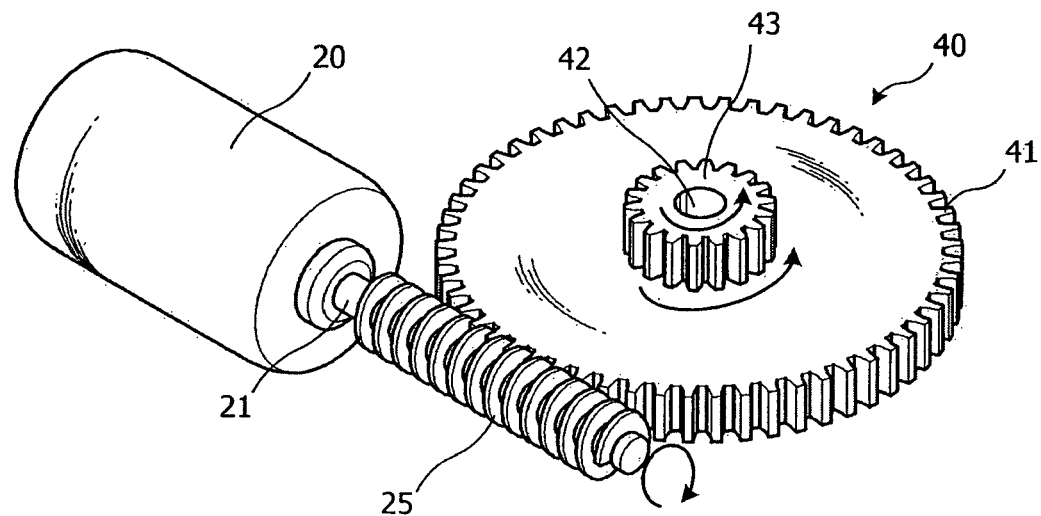
FIG. 4 is a view illustrating a connection structure between a driving motor and a driving gear.

FIGS. 4 through 7 illustrate assembly and operational relationships among the components of the cable-driving apparatus 200. FIG. 4 is a view illustrating the connection structure between the driving motor 20 and the driving gear 40. Referring to FIG. 4, if a worm gear 25, which is directly connected to the shaft 21 of the driving motor 20, is rotated clockwise, the driving gear 40 and the first sun gear 43 are rotated counterclockwise. The center hole 42 is defined through the center portion of the first sun gear 43 so that the connection pin 30 can pass through the center hole 42. In this way, in conformity with the ratio between the number of teeth of the worm gear 25 and the number of teeth 41 of the driving gear 40, reduction of a rotational velocity primarily occurs. When the number of teeth 41 of the driving gear 40 is n, while the worm gear 25 rotates one turn, the driving gear 40 rotates through an angle corresponding to one pitch thereof, whereby a velocity reduction effect of 1: n is obtained.

In the first embodiment, since the velocity reduction effect can be accomplished by the first planet gear assembly 180, the combination of the worm gear 25 and the driving gear 41 is not necessarily required. Accordingly, the first embodiment of the present invention can be modified in a manner such that the first sun gear 43 and the shaft 21 of the driving motor 20 are directly coupled to each other.

Figure 5:
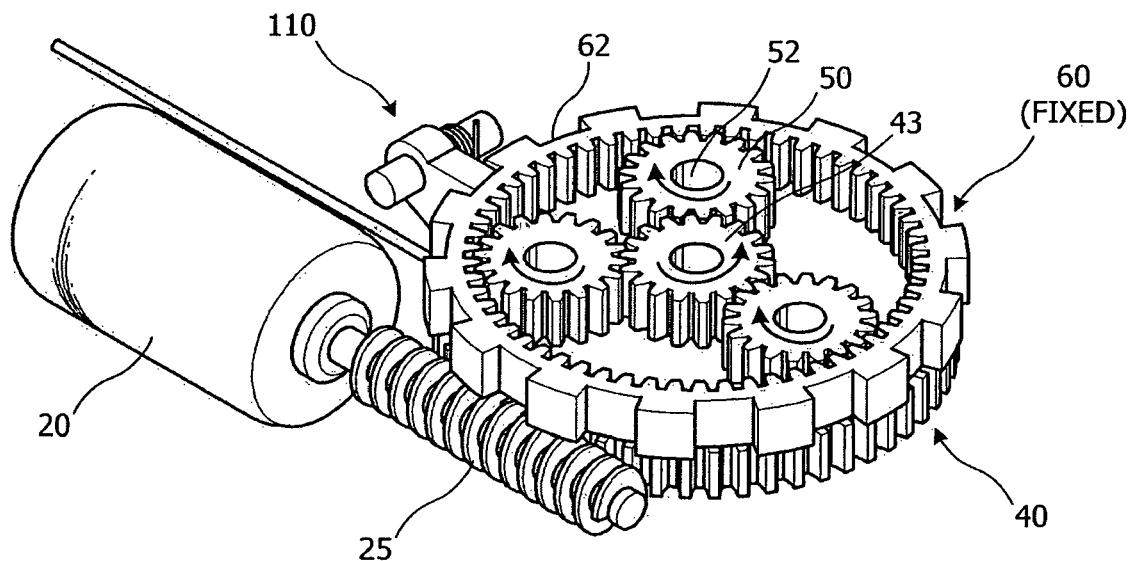
FIG. 5 is a view illustrating a structure in which first planet gears and a first ring gear are added to the structure of FIG. 4.

FIG. 5 is a view illustrating a structure in which the first planet gears 50 and the first ring gear 60 are added to the structure of FIG. 4. Here, the first ring gear 60 is fixedly held against movement due to the locking operation of the emergency release mechanism 110. Hence, as the first sun gear 43 is rotated counterclockwise, the planet gears 50 rotate clockwise about their own axes and revolve counterclockwise around the first sun gear 43.

Figure 6:
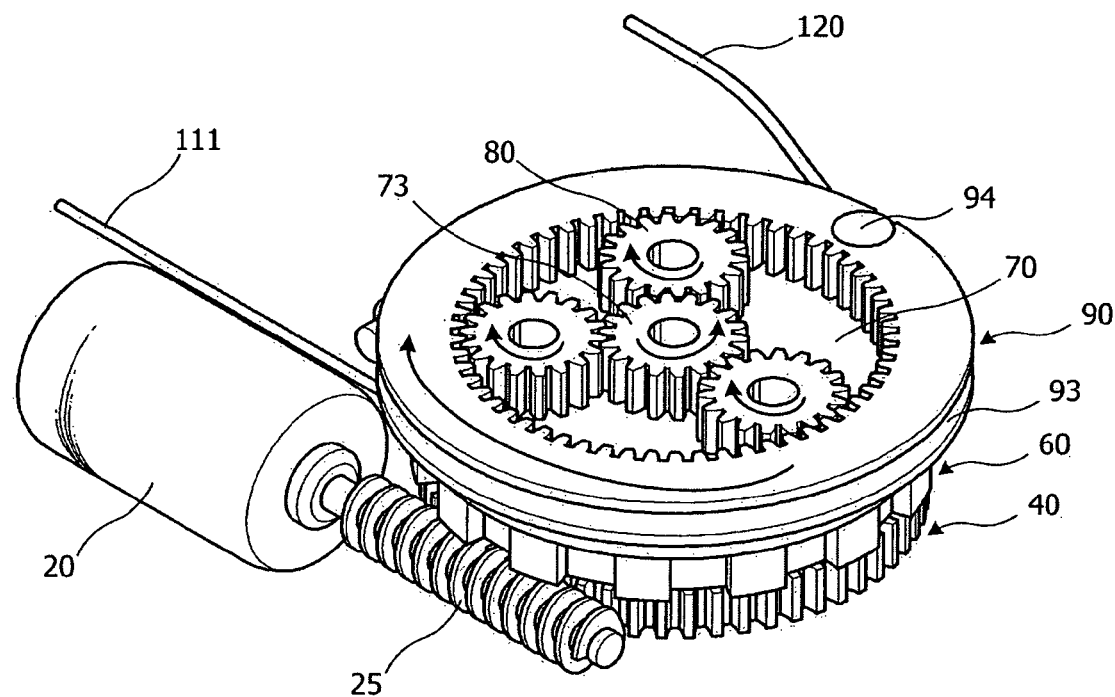
FIG. 6 is a view illustrating a structure in which a first carrier, second planet gears and a second ring gear are added to the structure of FIG. 5.

FIG. 6 is a view illustrating a structure in which the first carrier 70, the second planet gears 80 and the second ring gear 90 are added to the structure of FIG. 5. The shafts 71 (see FIG. 2) of the first carrier 70 are respectively fitted into the center holes 52 of the first planet gears 50. As the first planet gears 50 revolve counterclockwise, the first carrier 70, which is connected to the first planet gears 50 by the shafts 71, is likewise rotated counterclockwise. Due to the fact that the second sun gear 73 is provided to the center portion of one surface of the first carrier 70, the second sun gear 73 also rotates counterclockwise. Thereby, the second planet gears 80 rotate clockwise.

Unlike the first ring gear 60, the second ring gear 90 is not fixed. Therefore, the second planet gears 80 revolve counterclockwise, and the second ring gear 90 is rotated clockwise. The sum of the revolving velocity of the second planet gears 80 and the rotational velocity of the second ring gear 90 corresponds to the revolving velocity "V" of the second planet gears 80 when it is assumed that the second ring gear 90 is fixed. In other words, it can be said that the revolving velocity "V" is divided into the revolution of the second planet gears 80 and the rotation of the second ring gear 90.

As the second ring gear 90 is rotated clockwise, the first parking cable 120, which is connected at one end thereof to the second ring gear 90 by the first fastening member 94, is pulled with predetermined tension.

Figure 7:
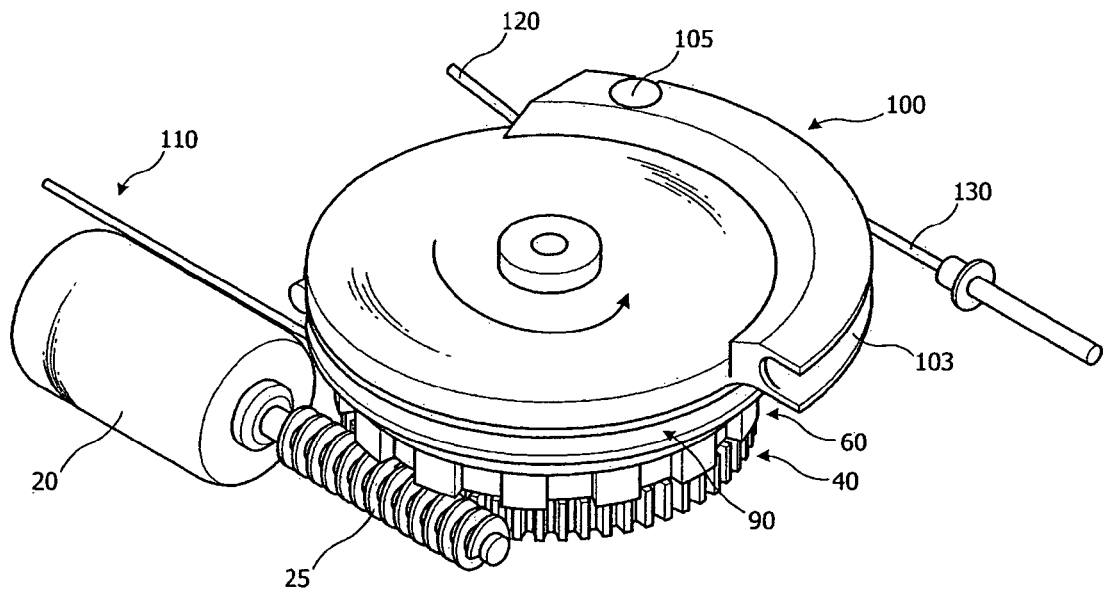
FIG. 7 is a view illustrating a structure in which a second carrier is added to the structure of FIG. 6.

FIG. 7 is a view illustrating a structure in which the second carrier 100 is added to the structure of FIG. 6. The shafts 101

(see FIG. 2) of the second carrier 100 are respectively fitted into the center holes 82 of the second planet gears 80 shown in FIG. 6. As the second planet gears 80 revolve counterclockwise, the second carrier 100, which is connected to the second planet gears 80 by the shafts 101, is likewise rotated counterclockwise. As the second carrier 100 is rotated counterclockwise, the second parking cable 130, which is connected at one end thereof to the second carrier 100 by the second fastening member 105, is pulled with predetermined tension.

Figure 8:
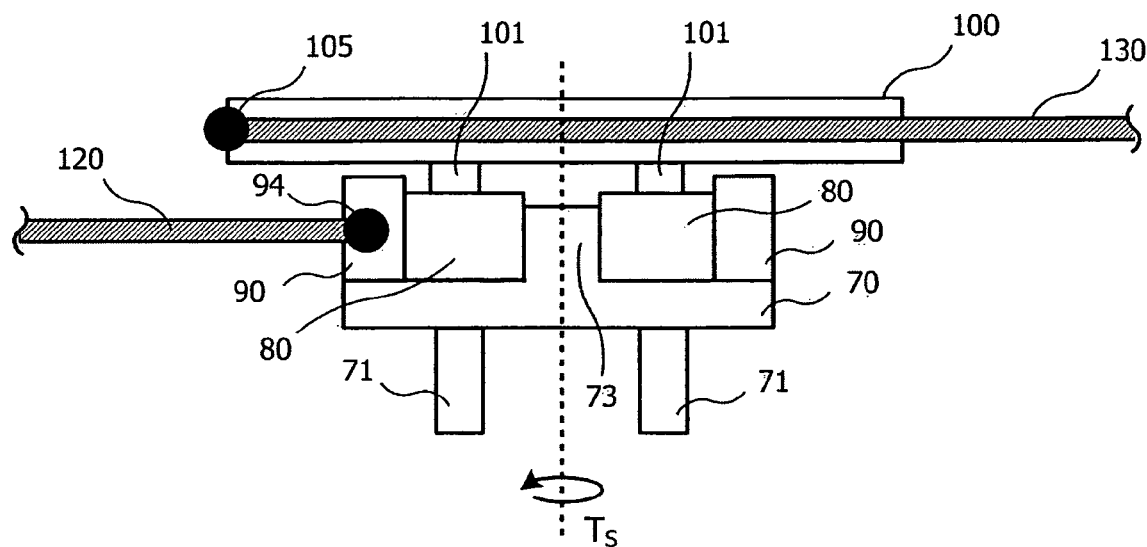
FIGS. 8 and 9 are views for explaining the principle and the condition by and under which the same tension is applied to two parking brake cables.
Figure 9:
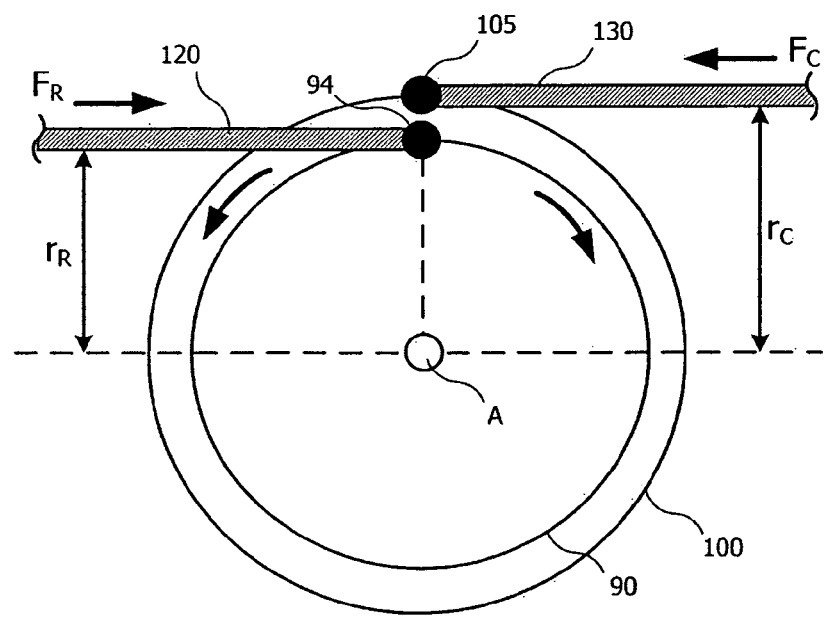

FIGS. 8 and 9 are views for explaining the principle and the condition by and under which the same tension is applied to the first parking cable 120 and the second parking cable 130.

Referring to FIG. 8, in the torque $T_S$ of the second sun gear 73, the torque $T_R$ of the second ring gear 90 and the torque $T_C$ of the second carrier 100, a relationship as given in the following equation (1) is established. That is to say, although the input condition (the torque $T_S$ of the second sun gear 73) is the same, a difference is induced between the torque $T_C$ of the second carrier 100 and the torque $T_R$ of the second ring gear 90. The difference is proportional to the difference in the reduction ratio between the second carrier 100 and the second ring gear 90.

$$T_C = T_S \times I_C, \; I_C = (Z_S 30 \; Z_R)/Z_S$$

$$T_R = T_S \times I_R, \; I_R = Z_R/Z_S$$

$$T_C/T_R = I_C/I_R \quad (1)$$

In Equation (1), $I_C$ designates the reduction ratio of the second carrier 100, $I_R$ designates the reduction ratio of the second ring gear 90, $Z_S$ designates the number of teeth of the second sun gear 73, and $Z_R$ designates the number of teeth of the second ring gear 90. Of course, an equivalent number of teeth of the second carrier 100 is expressed by the sum of $Z_S$ and $Z_R$.

Conditions for allowing the same tension to be applied to the parking cables 120 and 130 will be described with reference to FIG. 9. In FIG. 9, the distance from the center A to the first fastening member 94 to which the first parking cable 120 is connected, that is, the effective radius of the second ring gear 90 is represented by $r_R$, and the distance from the center A to the second fastening member 105 to which the second parking cable 130 is connected, that is, the effective radius of the second carrier 100 is represented by $r_C$. Further, the tension applied by the second ring gear 90 to the first parking cable 120 is represented by $F_R$, and the tension applied by the second carrier 100 to the second parking cable 130 is represented by $F_C$.

In general, force is calculated by dividing torque by a radius. Therefore, in order to ensure that $F_R$ equals $F_C$, the following equation (2) must be satisfied.

$$T_C/r_C = T_R/r_R \quad (2)$$

By combining Equation (1) and Equation (2), the result as given in the following Equation (3) can be obtained. That is to say, in the second ring gear 90 and the second carrier 100, it is to be readily understood that an effective radius must be proportional to the number of teeth of a gear.

$$r_C/r_R 32 \; I_C/I_R = (Z_S + Z_R)/Z_R \quad (3)$$

Figure 23:
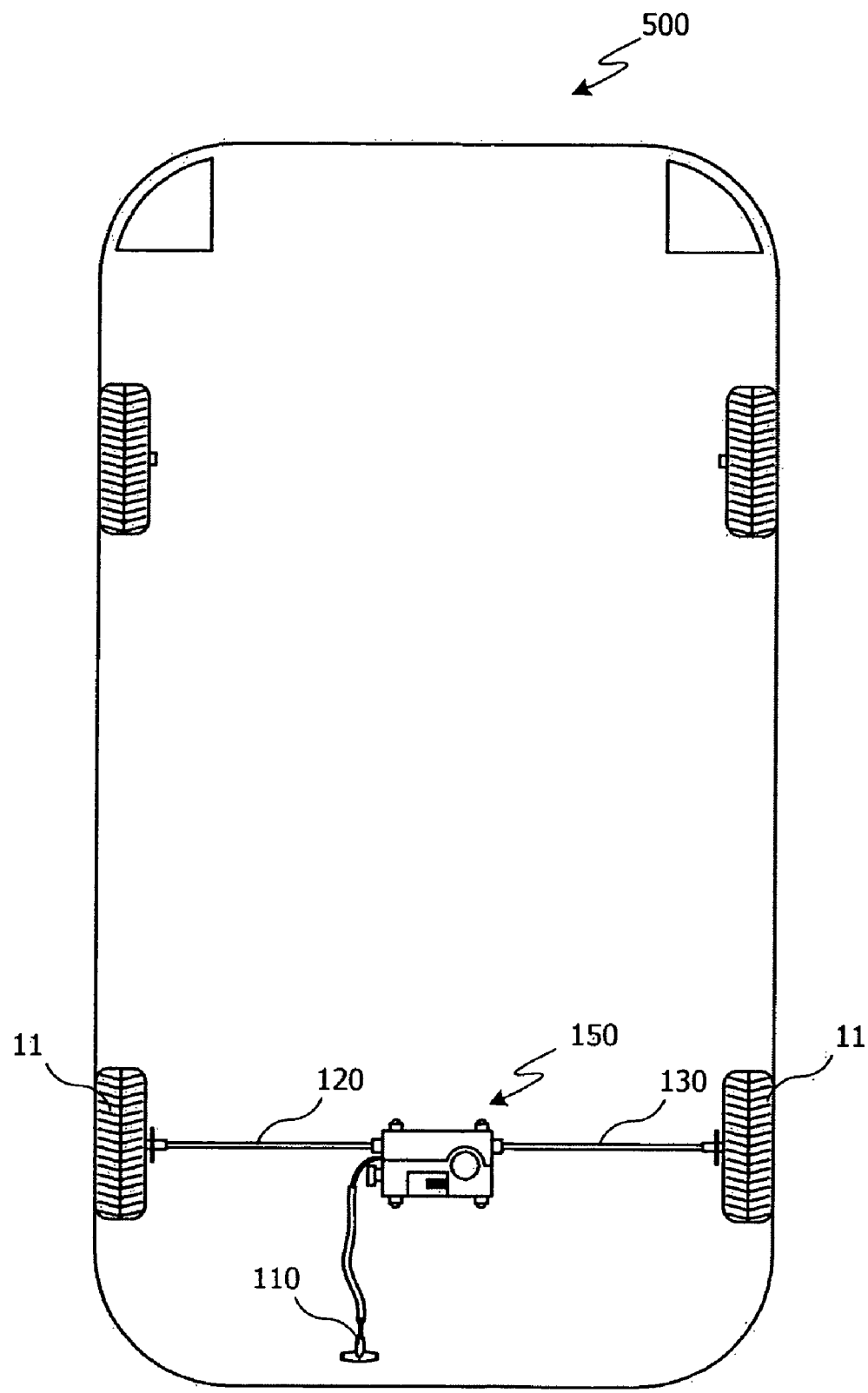
FIG. 23 is a view illustrating a state in which the cable-driving apparatus according to the exemplary embodiments of the present invention is mounted to a vehicle.

For example, when $Z_S = 20$ and $Z_R = 60$, the equivalent number of teeth of the carrier is 80. Therefore, the ratio between the effective radius of the second ring gear 90 and the effective radius of the second carrier 100 becomes 3:4. In this way, if the condition given in Equation (3) is satisfied, it is possible to apply the same tension to the parking cables 120 and 130 irrespective of the number of teeth of the sun gear, the number of teeth of the ring gear, and the equivalent number of teeth of the carrier. Through application of the tension of the same magnitude, the same braking force is applied to left and right wheels 11 as shown in FIG. 23. Due to this equalizer function, even when a different external force is applied to the wheels to which the parking cables 120 and 130 are connected, it is possible to apply the same tension to the parking cables 120 and 130 through the construction of the second planet gear assembly 190.

Heretofore, operations of an electronic parking brake using the cable-driving apparatus 200 in accordance with the first embodiment of the present invention have been described. In the cable-driving apparatus 200, even when the rotation of the driving motor 20 is stopped, the first planet gear assembly 180 and the second planet gear assembly 190 are prevented from being released due to the presence of the external force pulling the parking cables 120 and 130, which is called a self-locking structure.

As described above with reference to FIG. 3, in a planet gear assembly, if at least two components of a sun gear, a ring gear and a carrier are fixed, an effect is obtained in which planet gears are fixed. If the rotation of the driving motor 20 is stopped, since the first sun gear 43 and the first ring gear 60 (fixedly held by the emergency release mechanism 110) are fixed, the first carrier 70 is also fixed, by which the second sun gear 73 is also fixed.

As a result, because the second sun gear 73 and one of the parking cables 120 and 130 to which a greater external load is applied can be regarded as fixed ends, the second planet gear assembly 190 is also fixed. Accordingly, the cable-driving apparatus 200 in accordance with the first embodiment of the present invention can perform a self-locking function.

Now, if a driver wants to drive a parked car, the operation of the parking brake must be released first of all. This release procedure can be simply implemented by reversing the rotating direction of the driving motor 20 (into the counterclockwise direction) in FIG. 4. Even during this release procedure, the first ring gear 60 still remains fixed by the emergency release mechanism 110.

In this case, the first sun gear 43 is rotated clockwise, and the second sun gear 73 shown in FIG. 6 is also rotated clockwise. As a consequence, the second ring gear 90 is rotated counterclockwise, and the second carrier 100 is rotated clockwise. Thus, the first parking cable 120 is unwound from the second ring gear 90, and the second parking cable 130 is unwound from the second carrier 100. Therefore, as the left and right wheels 11 as shown in FIG. 1 are ready to be rotated, the driver can drive the car.

In the case where the cable-driving apparatus 200 normally operates by rotating the driving motor 20 clockwise or counterclockwise as described above, the parking brake can operate or be released from operation. However, in various emergency situations such as breakdown, occurrence of an accident, and others, due to the characteristic of the electronic parking brake, the electronic release procedure as described above cannot be appropriately conducted. In consideration of this fact, an emergency release mechanism for manually releasing the operation of the parking brake is additionally needed.

Figure 10:
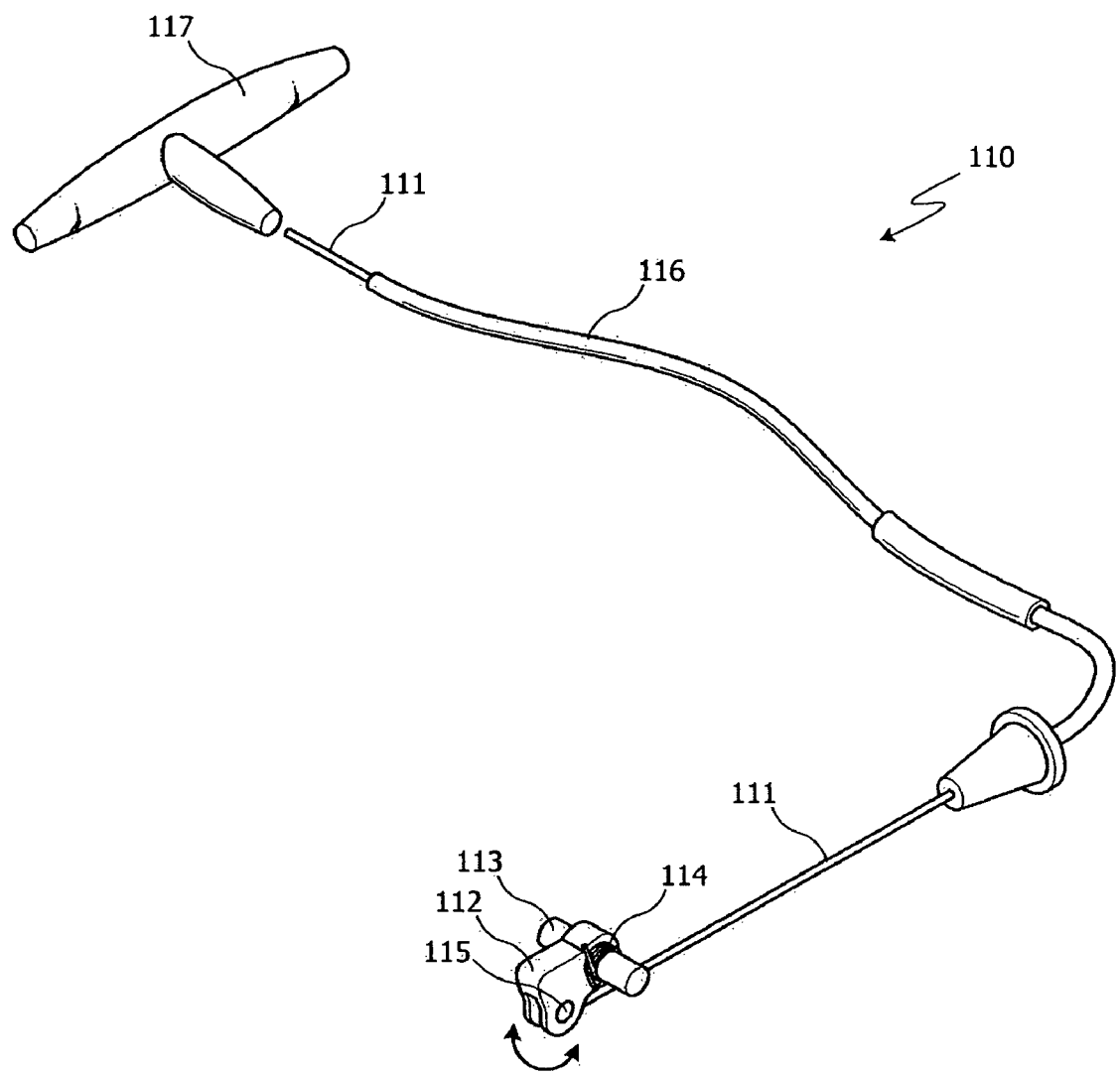
FIG. 10 is a view illustrating the construction of an emergency release mechanism applicable to the first embodiment of the present invention.

FIG. 10 is a view illustrating the construction of the emergency release mechanism 110 applicable to the first embodiment of the present invention. The emergency release mechanism 110 includes a cable 111, a tube 116, a handle 117, a projection 112, a rotation shaft 113, a torsion spring 114, and a cable fastening member 115.

While the cable 111 is not pulled, the projection 112 is engaged into one of the locking grooves 62 of the first ring gear 60 and prevents the rotation of the first ring gear 60. If the cable 111 is pulled, the projection 112 is pivoted about the rotation shaft 113. An end of the cable 111 is fastened to the cable fastening member 115, and slidably extends in the tube 116.

If the cable 111 is pulled, the projection 112 is pivoted downward and is disengaged from the locking groove 62 of the first ring gear 60. Thereafter, if the pulled cable 111 is freed, the projection 112 is returned to its original position by means of the torsion spring 114 and is engaged again into one of the locking grooves 62 of the first ring gear 60.

The driver can pull the cable 111 by pulling the handle 117 and free the cable 111 by freeing the handle 117.

Figure 11:
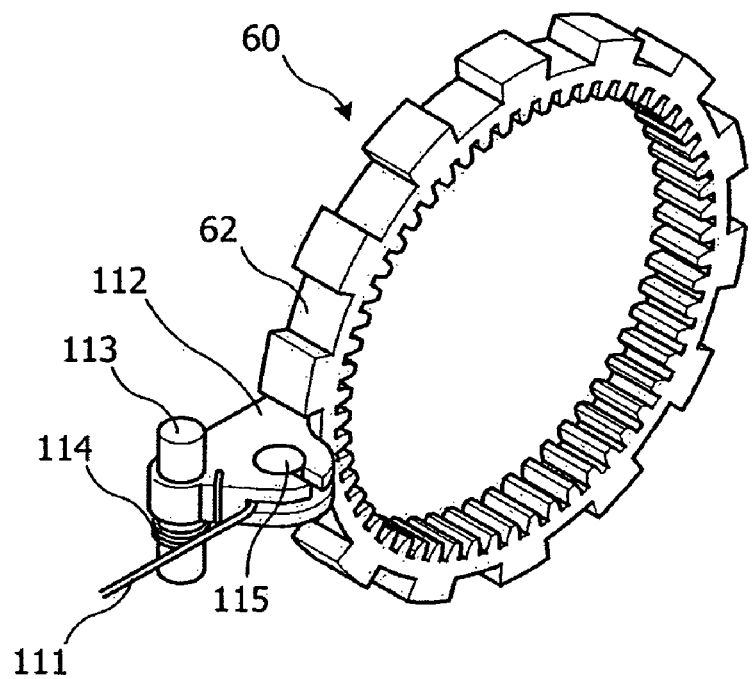
FIGS. 11 and 12 are views illustrating a state in which a projection is engaged into a locking groove.
Figure 12:
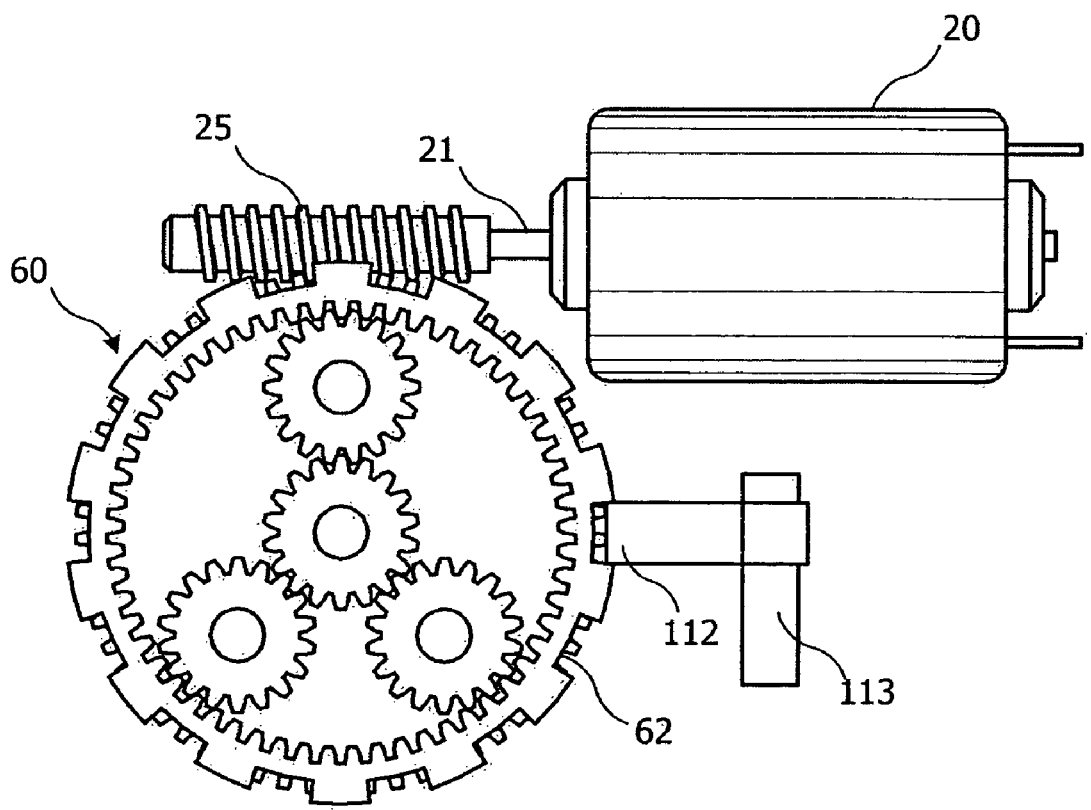

FIGS. 11 and 12 are views illustrating a state in which the projection 112 is engaged into the locking groove 62. Referring to FIGS. 11 and 12, in a state in which the projection 112 is engaged into the locking groove 62, the driver can disengage the projection 112 from the locking groove 62 by pulling the cable 111 and can engage again the projection 112 into the locking groove 62 by freeing the cable 111.

While the first parking cable 120 and the second parking cable 130 are pulled due to the rotation of the driving motor 20 as shown in FIGS. 6 and 7, for example, it is assumed that the rotation of the driving motor 20 is interrupted for some reason. In this situation, it is impossible to release the pulled state of the parking cables 120 and 130 through reversely rotating the driving motor 20. At this time, by manipulating the emergency release mechanism 110, the parking brake (the pulled state of the parking cables) can be manually released.

The operations of the first planet gear assembly 180 and the second planet gear assembly 190 when the first ring gear 60 is allowed to be freely rotated through the manipulation of the emergency release mechanism 110 will be described below.

Since the driving motor 20 is stopped, the driving gear 40 and the first sun gear 43 are fixed, and tension is applied to the parking cables 120 and 130 by the elasticity of return springs. Accordingly, the second carrier 100 and the second ring gear 90 serve as a driving side, and the second sun gear 73 serves as a driven side. Therefore, as the second carrier 100 serves as an input end and the second sun gear 73 serves as an output end, acceleration occurs similarly to case no. 3 of FIG. 3.

Meanwhile, as the first carrier 70 is also rotated through the rotation of the second sun gear 73, in the first planet gear assembly 180, the first carrier 70 performs a driving function. At this time, since the first ring gear 60 is driven and the first sun gear 43 is fixed, the situation corresponds to case no. 1 of FIG. 3. Accordingly, as the first carrier 70 serves as an input end and the first ring gear 60 serves as an output end, acceleration occurs.

As can be readily seen from these descriptions, if the first ring gear 60 is placed under a condition in which it can be freely rotated, the first parking cable 120 and the second parking cable 130 rotate the second ring gear 90 and the second carrier 100 by the elasticity of the return springs in directions opposite to the directions in which the second ring gear 90 and the second carrier 100 are rotated by the driving motor 20. That is to say, the first parking cable 120 and the second parking cable 130 respectively rotate the second ring gear 90 counterclockwise and the second carrier 100 clockwise. As a result, the first ring gear 60 undergoes accelerated rotation, and the parking cables 120 and 130 are unwound.

As described above, according to the first embodiment of the present invention, substantially the same tension can be applied to the parking cables 120 and 130 through the rotation of the driving motor 20, the pulled state of the parking cables 120 and 130 can be released through the reverse rotation of the driving motor 20, and the pulled state of the parking cables 120 and 130 can be manually released through pulling the handle 117 of the emergency release mechanism 110.

When the parking cables 120 and 130 are pulled through the rotation of the driving motor 20, the rotation of the driving motor 20 must be interrupted at a predetermined time. Otherwise, the parking cables 120 and 130 may snap, the durability of the parking cables 120 and 130 may deteriorate, or other defects may be caused. The problem is when to stop the rotation of the driving motor 20. In a method in which the driving motor 20 is simply interrupted after being rotated through predetermined revolutions, if the parking cables elongate, the parking brake cannot properly operate. Under these circumstances, techniques have been disclosed in the art, in which tension applied to the parking cables 120 and 130 is measured and the rotation of the driving motor 20 is interrupted when the tension reaches a predetermined limit.

In these conventional techniques, in order to measure the tension of the parking cables 120 and 130, a spring is inserted into the parking cable to extend parallel to the parking cable, and the tension applied to the spring is measured. However, it is not preferable in view of safety to insert an additional element into the parking cable, and the precision of the measurement is not satisfactory.

Figure 13:
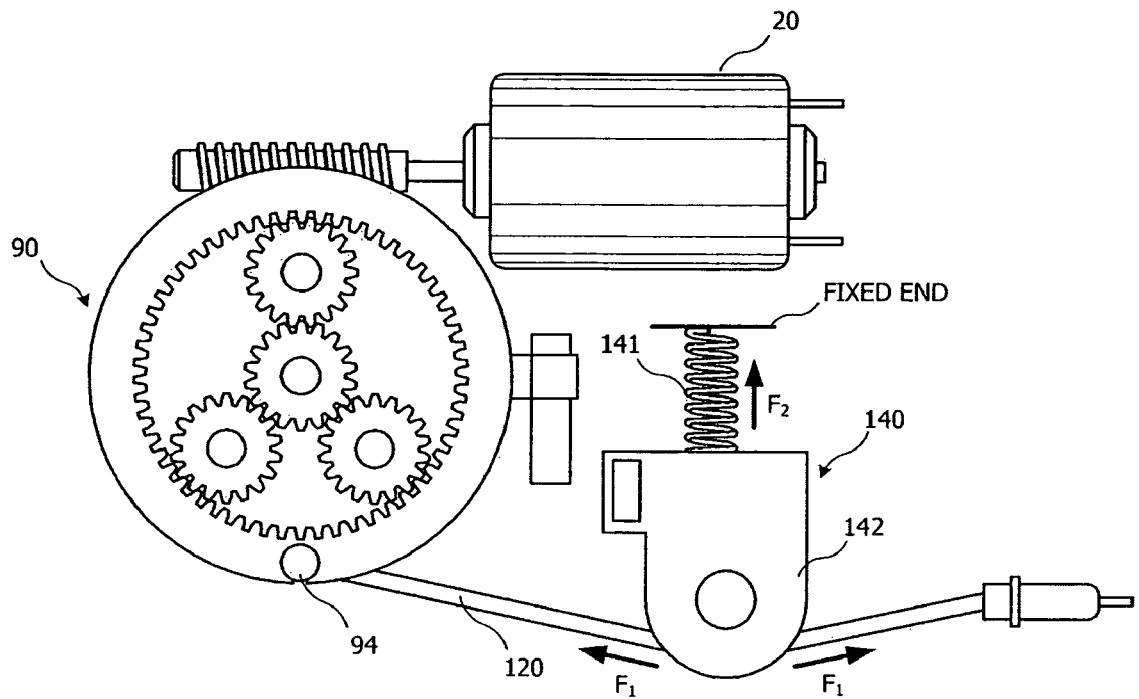
FIG. 13 is a view illustrating a configuration in which a load-sensing mechanism is installed on a second parking brake cable.

Thus, in the present invention, as shown in FIG. 13, a load-sensing mechanism 140 is mounted in a direction perpendicular to at least one of the first and second parking cables 120 and 130 to indirectly sense the tension $F_1$ of the cable 120. FIG. 13 illustrates an example in which the load-sensing mechanism 140 is installed on the first parking cable 120.

The more the tension $F_1$ of the parking cable 120 increases, the more the compressive force $F_2$ applied to the spring 141 of the load-sensing mechanism 140 proportionally increases. In this regard, the tension $F_1$ can be defined by the equation:

$$F_1 = c \times F_2, \quad (4)$$

where "c" is a proportional constant and can be simply obtained through an experiment.

Figure 14:
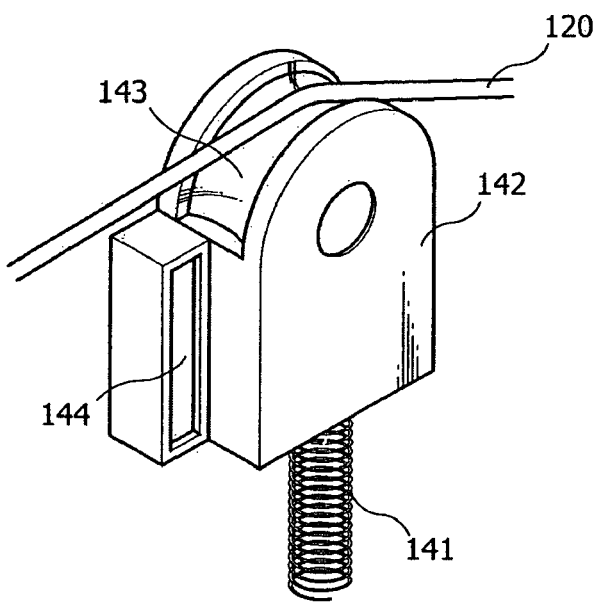
FIG. 14 is a perspective view illustrating the load-sensing mechanism.
Figure 15:
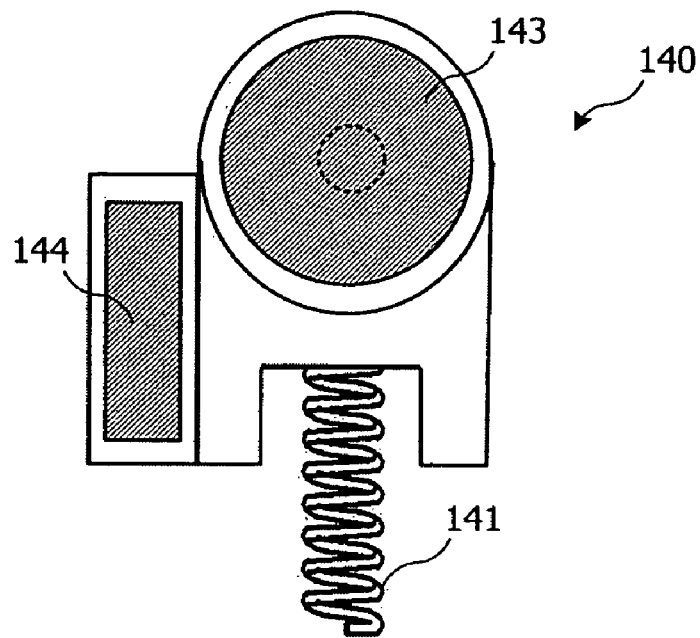
FIG. 15 is a longitudinal cross-sectional view of the load-sensing mechanism shown in FIG. 14.
Figure 16:
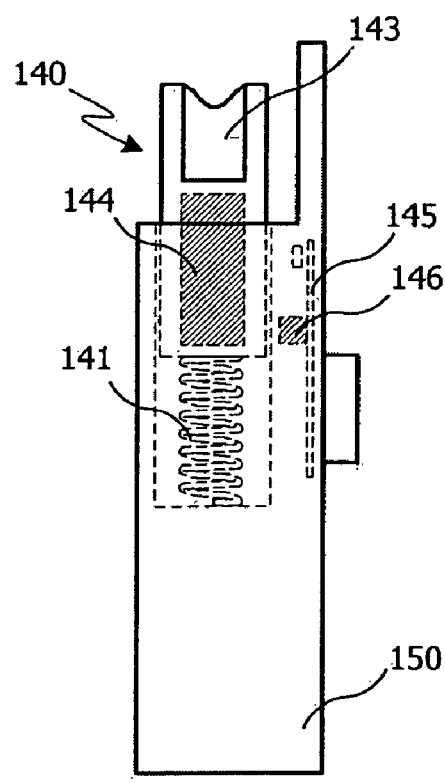
FIG. 16 is a view for explaining the operation of the load-sensing mechanism shown in FIG. 14.

Referring to FIG. 14 and FIG. 15 which is a longitudinal cross-sectional view of FIG. 14, the load-sensing mechanism 140 in accordance with the embodiment of the present invention includes a roller 143 having a circumferential surface which is brought into contact with the parking cable 120, a spring 141 for supporting the roller 143 against the compressive force from the parking cable 120, a permanent magnet 144 secured to a side of the load-sensing mechanism 140, a Hall IC (Hall integrated circuit) 146 for sensing upward and downward movement of the permanent magnet 144, and a PCB (printed circuit board) 145 attached to a housing 150 (see FIG. 16).

FIG. 16 is a view for explaining the operation of the load-sensing mechanism 140 shown in FIG. 14.

When tension is applied to the parking cable 120, the load-sensing mechanism 140 is moved in a direction perpendicular to the parking cable 120, and the permanent magnet 144 is also moved therewith. At this time, the Hall IC 146, which is secured to the PCB 145 mounted to the housing 150, measures the positional displacement of the permanent magnet 144. The measured position change information of the permanent magnet 144 is transmitted to a controller (not shown). The controller calculates $F_2$ from the measured displacement and calculates $F_1$ applied to the parking cable 120 from the calculated $F_2$. If tension $F_1$ reaches a predetermined limit, the controller reduces the number of revolutions of the driving motor 20 or interrupts the rotation of the driving motor 20, thereby preventing excessive tension from being applied to the parking cables 120 and 130.

It is preferable that the limit be appropriately determined in consideration of conditions of a road such as the inclination, curvature, slippage, and others, rather than using a fixed value.

Figure 17:
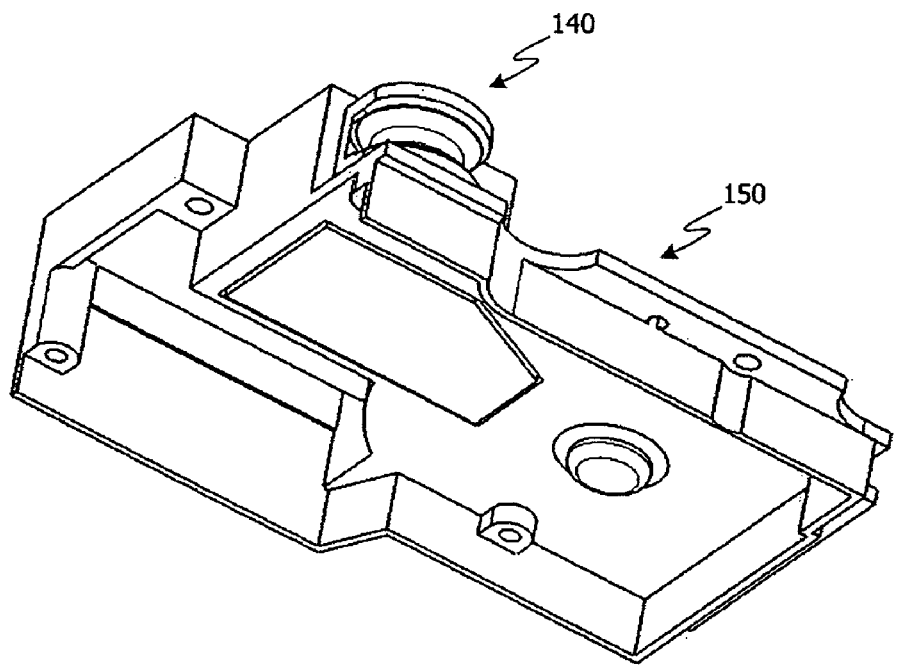
FIG. 17 is a view illustrating the configuration in which the load-sensing mechanism shown in FIG. 14 is mounted on a housing.

FIG. 17 is a view illustrating the configuration in which the load-sensing mechanism 140 shown in FIG. 14 is mounted on the housing 150. The housing 150 accommodates the load-sensing mechanism 140 and the cable-driving apparatus 200.

Figure 18:
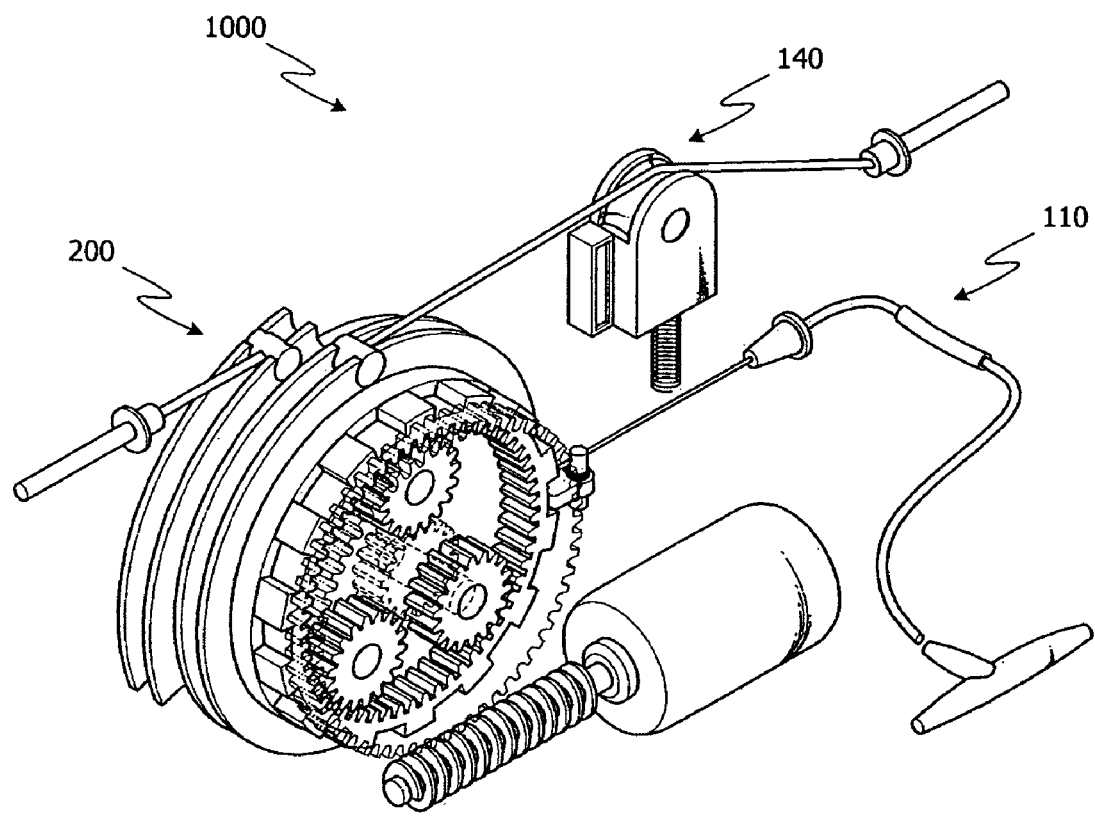
FIG. 18 is a perspective view illustrating the construction of a parking brake system in accordance with the first embodiment of the present invention.

FIG. 18 is a perspective view illustrating the construction of the parking brake system in accordance with the first embodiment of the present invention. As shown in FIG. 18, the parking brake system 100 includes the cable-driving apparatus 200, the emergency release mechanism 110, and the load-sensing mechanism 140.

The cable-driving apparatus 200 in accordance with the first embodiment of the present invention is realized using the two planet gear assemblies 180 and 190. However, it is to be noted that the present invention is not limited to this embodiment, and the cable-driving apparatus can be realized using three or more planet gear assemblies as a matter of choice by a person having ordinary knowledge in the art.

Figure 19:
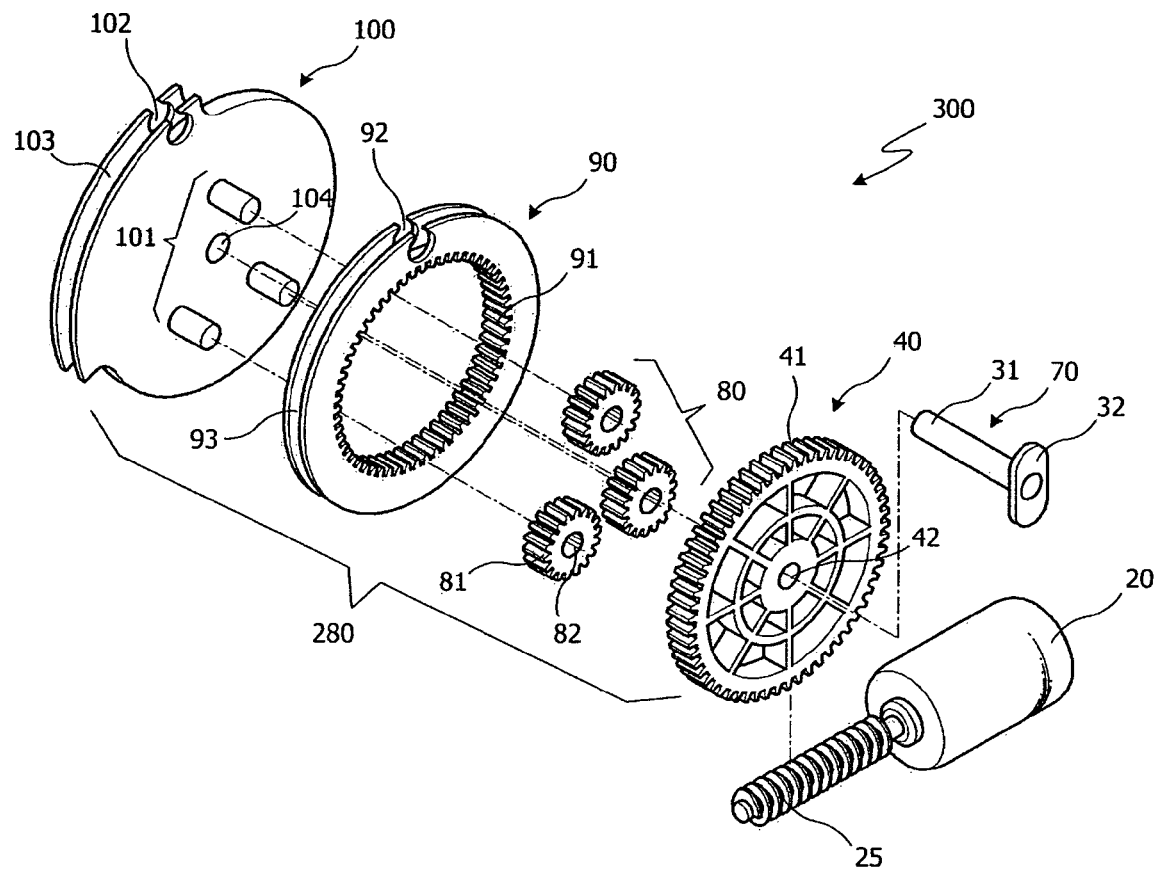
FIG. 19 is an exploded perspective view illustrating the construction of a cable-driving apparatus in accordance with a second embodiment of the present invention.

Also, as shown in FIG. 19, a cable-driving apparatus 300 in accordance with a second embodiment of the present invention can be realized using only one planet gear assembly 280. Unlike the cable-driving apparatus 200, the emergency driving mechanism 110 is not applied to the cable-driving apparatus 300. Nevertheless, as in the first embodiment, the tension equalization effect of the parking cables can be achieved, and the load-sensing mechanism 140 can be applied in the same way.

When comparing the cable-driving apparatus 300 of FIG. 19 with the cable-driving apparatus 200 in FIG. 2, the first carrier 70, the first ring gear 60 and the first planet gears 50 are omitted, and the first sun gear 43 of the driving gear 40 is directly coupled to the second planet gears 80.

Figure 20:
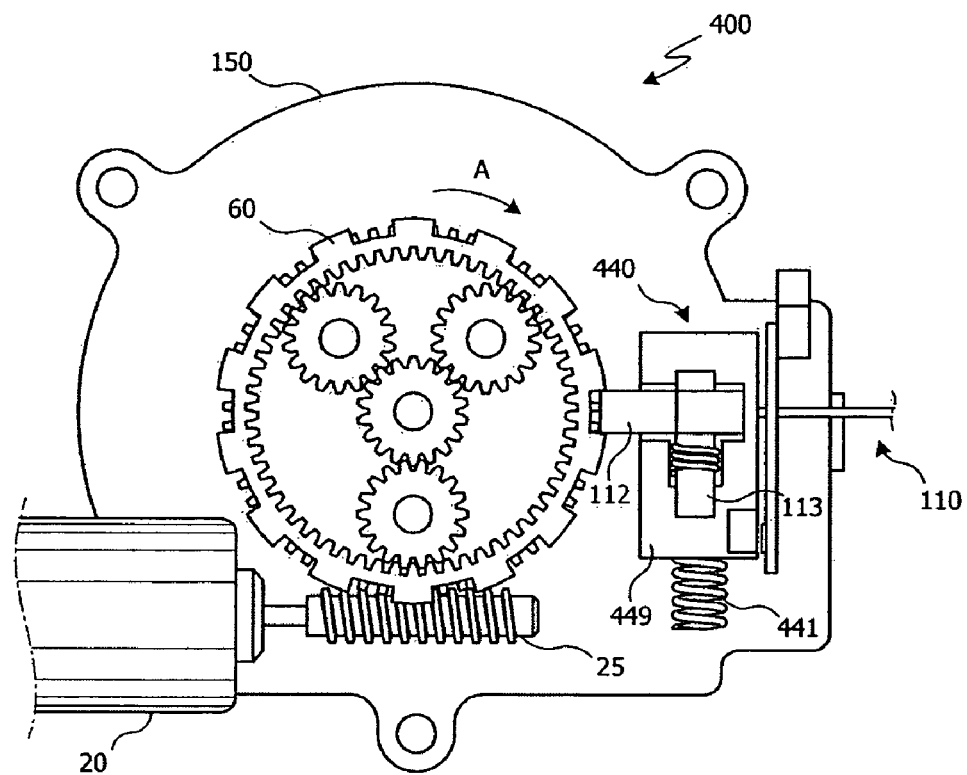
FIGS. 20 and 21 are views illustrating the construction of a cable-driving apparatus in accordance with a third embodiment of the present invention.
Figure 21:
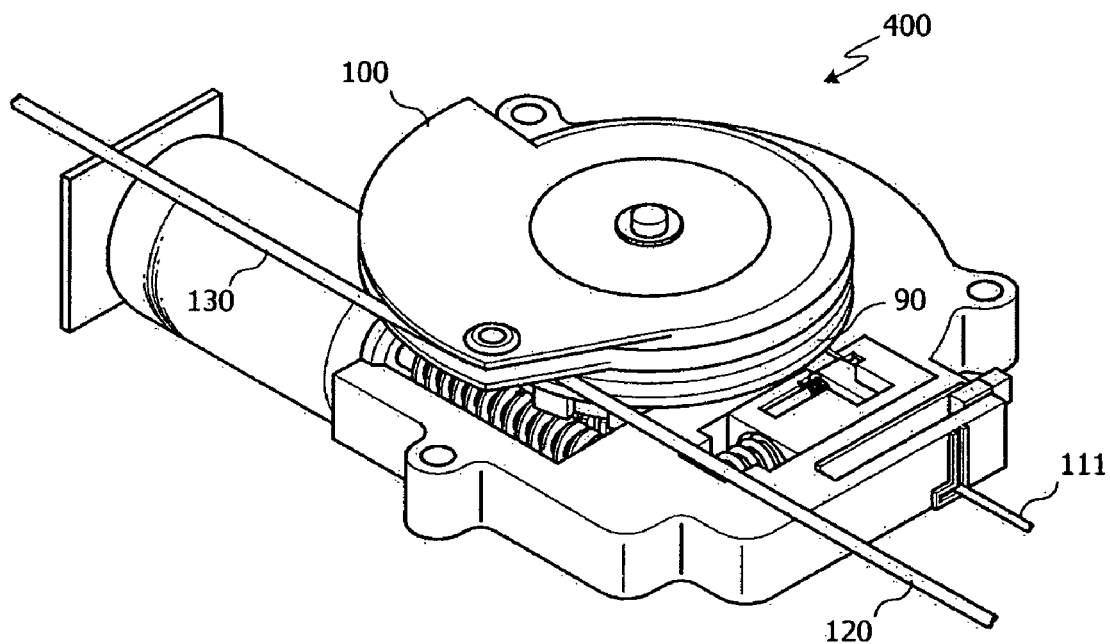
Figure 22:
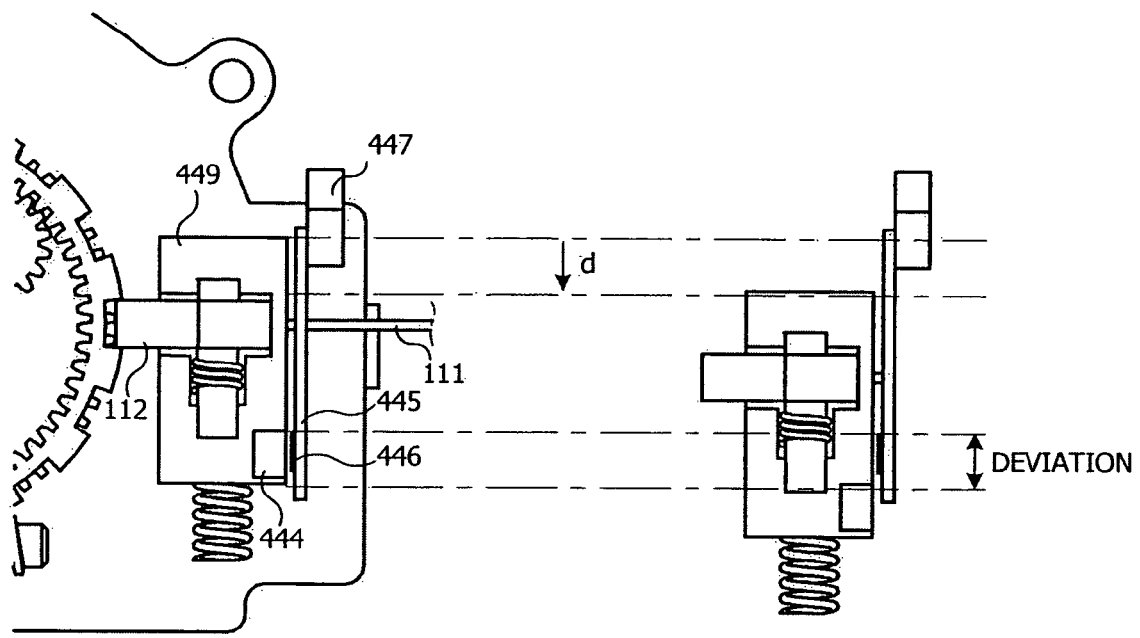
FIG. 22 is a view illustrating a state in which a load-sensing mechanism is deviated from an original position.

FIGS. 20 through 22 are views illustrating the construction of a cable-driving apparatus in accordance with a third embodiment of the present invention. When comparing this third embodiment with the first embodiment, the constructions of the emergency release mechanism and the load-sensing mechanisms are slightly modified, and the other components including the planet gear assemblies are not changed.

FIGS. 20 and 21 are views illustrating the construction of the cable-driving apparatus in accordance with the third embodiment of the present invention. Unlike the emergency release mechanism 110 of the cable-driving apparatus 200, the emergency release mechanism 110 of the cable-driving apparatus 400 is integrally formed with a load-sensing mechanism 440.

As in the first embodiment, as the parking cables 120 and 130 are pulled, the first ring gear 60 is going to rotate in the direction indicated by the arrow A. At this time, as the projection 112 of the emergency release mechanism 110 is engaged into the locking groove of the first ring gear 60, the rotation of the first ring gear 60 is prevented.

Due to the fact that the projection 112 is fitted through a housing 449 and the rotation shaft 113 of the load-sensing mechanism 440 and the housing 449 is supported by a spring 441, the first ring gear 60 is slightly rotated in the direction indicated by the arrow "A" against the elastic force of the spring 441.

By this slight rotation, the housing 449 including the projection 112 is moved downward. FIG. 22 illustrates an operation principle of the load-sensing mechanism 140 when the housing 449 is moved from an original position.

As the first ring gear 60 is slightly rotated, the housing 449 is moved downward by a distance d, and the permanent magnet 444 mounted to the housing 449 is also moved downward by the distance d. Accordingly, a deviation d exists between the Hall IC 446 mounted to a PCB 445 and the permanent magnet 444. At this time, the intensity of a magnetic field which is measured by the Hall IC 446 decreases in proportion to the size of the deviation.

If the intensity of the magnetic field decreases below a predetermined level, that is, if the deviation becomes greater than a predetermined value, the circuit of the PCB 445 determines that an excessive load is applied to the parking cables 120 and 130, and transmits a signal to a controller (not shown) through a connector 447. Then, the controller reduces the number of revolutions of the driving motor 20 or interrupts the rotation of the driving motor 20, and prevents excessive tension from being applied to the parking cables 120 and 130.

As in the first embodiment, when a driver pulls the cable 111 of the emergency release mechanism 110, the projection 112 is disengaged from the first ring gear 60, whereby the locking of the parking brake can be released. In the third embodiment, since the emergency release mechanism 110 and the load-sensing mechanism 440 are integrally formed with each other, the size of the cable-driving apparatus can be decreased, and it is possible to prevent load measurement from being concentratedly conducted on any one of the parking cables 120 and 130.

FIG. 23 is a view illustrating a state in which the cable-driving apparatus according to the exemplary embodiments of the present invention is mounted to a vehicle. The housing 150 can accommodate the cable-driving apparatus 200 or 300 and the load-sensing mechanism 140 according to the exemplary embodiments of the present invention. The first parking cable 120 and the second parking cable 130 are exposed out of the housing 150 and are respectively connected to the wheels 11. While it is illustrated in FIG. 23 that the parking cables 120 and 130 are connected to the rear wheels of a vehicle 500, it is to be readily understood that the parking cables 120 and 130 may be connected to the front wheels of the vehicle 500.

Also, the cable 111 and the handle 117 of the emergency release mechanism 110 are exposed out of the housing 150. As a driver pulls the handle 117 of the emergency release mechanism 110, it is possible to manually release the operation of the parking brake.

As is apparent from the above description, the cable-driving apparatus and the parking brake system according to the present invention provide advantages in that the safety of a driver is ensured, the space utilization efficiency of a vehicle is improved, and the same braking force can be applied to both wheels without using a separate equalizer.

Further, due to a reduction structure using a planet gear assembly and equalization of force applied to the parking brake cables, power required for driving a motor can be saved.

Also, under an emergency situation, the parking brake can be manually released through a simple manipulation.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A cable-driving apparatus comprising:
  a driving motor;
  a first planet gear assembly reducing a rotational velocity of the driving motor; and a second planet gear assembly coupled to the first planet gear assembly,
  wherein a first parking brake cable is connected to a circumferential outer surface of a ring gear of the second planet gear assembly, and a second parking brake cable is connected to a circumferential outer surface of a carrier of the second planet gear assembly in an opposite direction to the first parking brake cable, wherein, by reverse rotation of the driving motor, the first parking brake cable is unwound from the ring gear, and the second parking brake cable is unwound from the carrier.

2. The apparatus of claim 1, wherein a ratio between an effective radius of the ring gear and an effective radius of the carrier is substantially similar to a ratio between the number of teeth of the ring gear and the number of teeth of the carrier.

3. The apparatus of claim 1, wherein, by rotation of the driving motor, the first parking brake cable is wound on the circumferential outer surface of the ring gear, and the second parking brake cable is wound on the circumferential outer surface of the carrier.

4. The apparatus of claim 3, wherein grooves are respectively defined on the circumferential outer surfaces of the ring gear and the carrier so that the parking brake cables are easily wound.

5. The apparatus of claim 3, wherein tension of the first brake cable is substantially same as tension of the second parking brake cable.

6. The apparatus of claim 1, wherein power transmission between the driving motor and the first planet gear assembly is conducted by a worm gear, and, when the driving motor is stopped, even though external force for pulling the first parking brake cable and the second parking brake cable is applied, the first planet gear assembly and the second planet gear assembly are not rotated.

7. The apparatus of claim 1, wherein a sun gear of the second planet gear assembly is formed on one surface of a carrier of the first planet gear assembly.

8. A parking brake system comprising:
a driving motor;
a first planet gear assembly reducing a rotational velocity of the driving motor; and
a second planet gear assembly coupled to the first planet gear assembly,
wherein locking grooves are defined on a circumferential outer surface of a ring gear of the first planet gear assembly, and emergency release means is engaged into one of the locking grooves to fixedly hold the ring gear, and
wherein a first parking brake cable is connected to a circumferential outer surface of a ring gear of the second planet gear assembly, and a second parking brake cable is connected to a circumferential outer surface of a carrier of the second planet gear assembly in an opposite direction to the first parking brake cable.

9. The system of claim 8, wherein a ratio between an effective radius of the ring gear of the second planet gear assembly and an effective radius of the carrier is substantially the same as a ratio between a reduction ratio of the ring gear and a reduction ratio of the carrier.

10. The system of claim 8, wherein a ratio between an effective radius of the ring gear of the second planet gear assembly and an effective radius of the carrier is substantially the same as a ratio between the number of teeth of the ring gear and the number of teeth of the carrier.

11. The system of claim 8, wherein, by rotation of the driving motor, the first parking brake cable is wound on the circumferential outer surface of the ring gear, and the second parking brake cable is wound on the circumferential outer surface of the carrier.

12. The system of claim 8, wherein, by reverse rotation of the driving motor, the first parking brake cable is unwound from the ring gear of the second planet gear assembly, and second parking brake cable is unwound from the carrier.

13. The system of claim 8, wherein, when the emergency release means is disengaged from the locking groove, the first parking brake cable is unwound from the ring gear of the second planet gear assembly, and the second parking brake cable is unwound from the carrier.

14. The system of claim 13, wherein the emergency release mechanism comprises:
a projection formed to be engaged into the locking groove;
a handle operating and freeing operation of the emergency release mechanism;
a cable connecting the projection and the handle to each other;
a rotation shaft provided to the projection to allow the projection to be pivoted and disengaged from the locking groove when the emergency release mechanism is operated; and
a torsion spring applying a rotational restoring force to allow the projection to be engaged into the locking groove when operation of the emergency release mechanism is freed.

15. The system of claim 8, further comprising a load-sensing mechanism mounted on at least one of the first and second parking brake cables.

16. The system of claim 15, wherein the load-sensing mechanism comprises:
a roller having a circumferential surface which is brought into contact with the first parking brake cable;
a spring supporting the roller against pressing force of the first parking brake cable;
a permanent magnet secured to a side of the load-sensing mechanism; and
a Hall IC for sensing displacement of the permanent magnet.

17. The system of claim 8, further comprising a load-sensing mechanism integrally coupled to the emergency release mechanism for sensing a load applied by the ring gear.

18. The system of claim 17, wherein the load-sensing mechanism comprises:
a housing accommodating the emergency release mechanism;
a spring provided to the housing to sustain the load applied;
a permanent magnet secured to a side of the housing; and
a Hall IC sensing displacement of the permanent magnet when the housing is moved.

19. The system of claim 18, further comprising a controller receiving the sensed displacement and reducing a speed of or stopping the driving motor when the displacement reaches a predetermined limit.

20. The system of claim 19, wherein the predetermined limit is changed depending upon a condition of a road on which a vehicle having the parking brake system travels.

* * * * *